Oct. 21, 1952          G. C. WYMAN          2,614,721
COVER LOCKING MEANS FOR PRESSURE COOKERS
Filed March 31, 1948          3 Sheets-Sheet 1
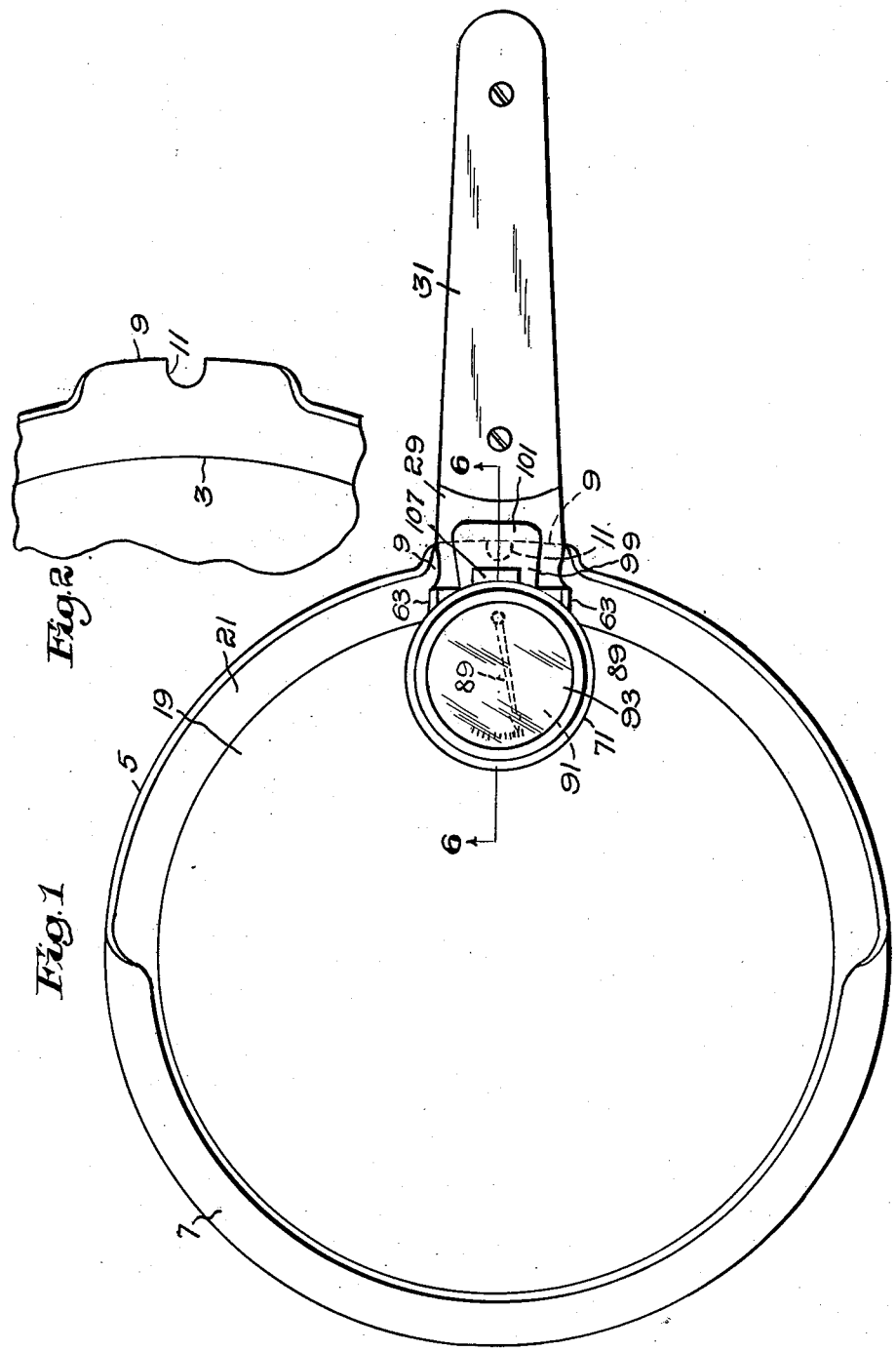
Inventor:
Glenn C. Wyman.

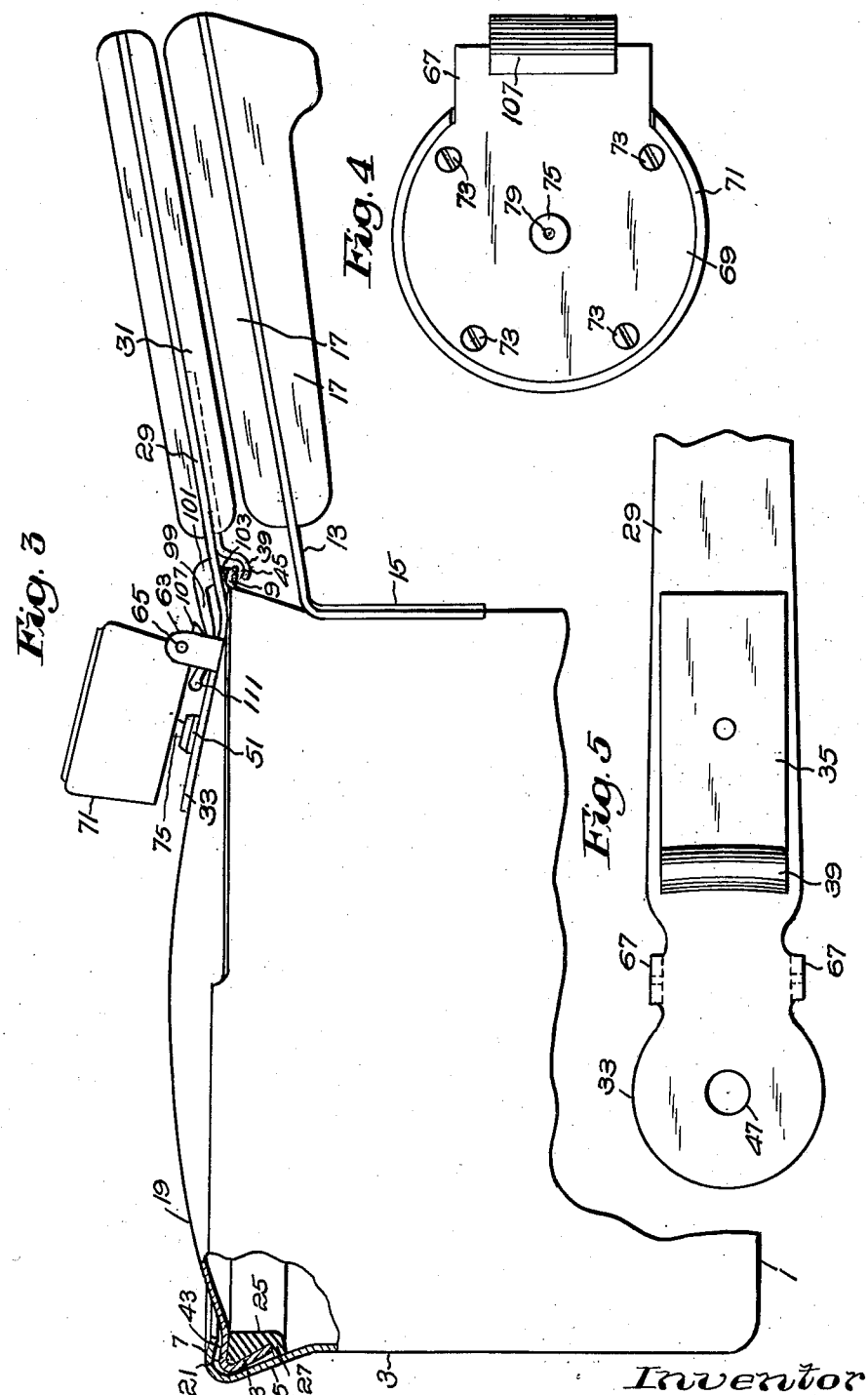

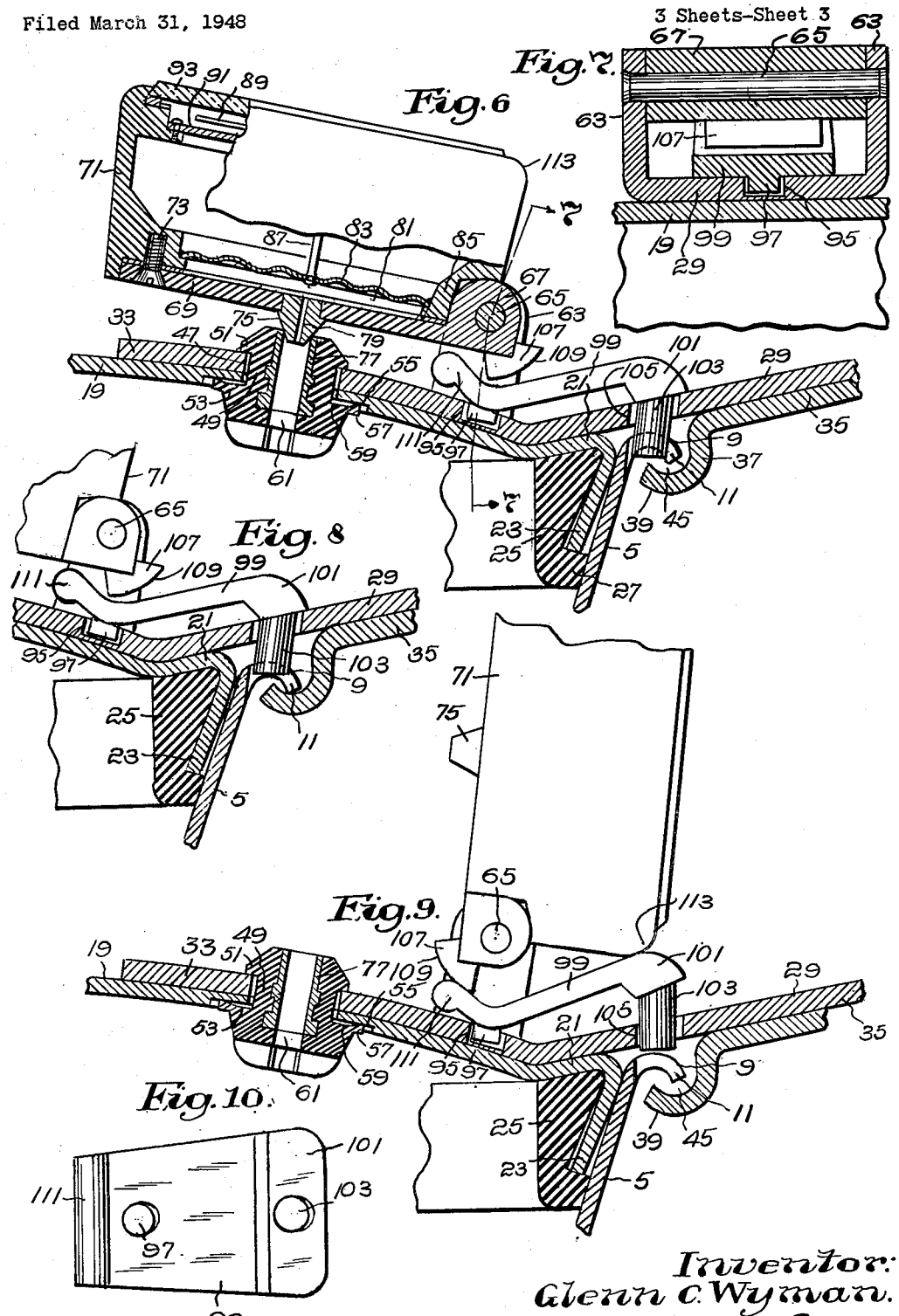

Patented Oct. 21, 1952

2,614,721

UNITED STATES PATENT OFFICE 2,614,721

COVER LOCKING MEANS FOR PRESSURE COOKERS

Glenn C. Wyman, Rome, N. Y., assignor to Revere Copper and Brass Incorporated, Rome, N. Y., a corporation of Maryland Application March 31, 1948, Serial No. 18,280

3 Claims. (Cl. 220—40)

My invention relates to pressure cookers.

The invention has among its objects a pressure cooker having provision for enforcing venting thereof before the cover can be opened.

The above and other objects of the invention will be best understood from the following description when read in the light of the accompanying drawings of a specific embodiment of the invention, while the scope of the invention will be more particularly pointed out in the appended claims.

In the drawings:

Fig. 1 is a plan of a pressure cooker according to the invention;

Fig. 2 shows a detail of Fig. 1, on an enlarged scale, with parts omitted;

Fig. 3 is an elevation of a pressure cooker according to Fig. 1, with parts in section;

Fig. 4 is a bottom view of the weight gauge according to Figs. 1 and 3;

Fig. 5 is a bottom view of a fragment of the cover handle before being attached to the cover;

Fig. 6 is a section on the line 6—6 of Fig. 1, on an enlarged scale;

Fig. 7 is a fragmentary section on the line 7—7 of Fig. 6;

Figs. 8 and 9 are, respectively, sections corresponding to Fig. 6 showing the parts in different operative positions; and Fig. 10 is a bottom view of the locking member according to the preceding figures.

The pressure cooker illustrated by the drawings comprises a container, preferably formed of sheet metal such as stainless steel, having a bottom wall 1 and cylindrical side walls 3. Adjacent their upper edges the side walls are formed to present an outwardly flared frusto-conical portion 5 extending entirely about said walls. At its upper edge this frusto-conical portion is formed to present an inwardly turned lip 7 extending about said portion for approximately 180°. At the side of the frusto-conical portion diametrically opposite the lip 7 said portion is formed with an outwardly projecting downwardly turned lip 9 of much shorter angular extent than the lip 7. Midway its length the lip 9 is shown as formed with a notch 11. Carried by the container is a radially projecting handle 13 having a base portion 15 secured to the cylindrical wall of the container, preferably by welding, this handle being provided with the handle grips 17.

As shown, the cover, which also is formed of sheet metal, preferably stainless steel, is shaped to present a dome-like central portion 19 surrounded by a flattened relatively narrow annular flange 21. Integral with the outer peripheral edge of this flange is an inwardly turned downwardly extending frusto-conical flange 23 extending entirely about the cover. Carried by the cover at its under side is a gasket ring 25 of greater height than the flange 23, this ring being formed of flexible material such as synthetic rubber, shaped to fit into the space between the flanges 21 and 23 and to provide a lower portion 27 which projects radially beyond the outer side of the flange 23 at its lower edge so as to bear uninterruptedly against the inner wall of the frusto-conical portion 5 of the container when the cover is assembled with the latter.

As shown, the cover is provided with a radially projecting handle 29 provided with the handle grips 31. This handle is provided with a base portion 33 which, and the adjacent portion of the handle conform to the upper sides of the dome-shaped portion 19 and annular flange 21 of the cover to which they are secured preferably by welding. Secured to the under side of the handle 29, preferably by welding, is the base 35 of a strip-like member which, at its end adjacent the cover, is provided with a downturned portion 37, which latter, at its lower end, is upwardly turned to form a hook 39.

When the parts are in the position shown by the drawings the cover is retained on the container by the container lip 7 positioned above the cover flange 21 and by the container lip 9 positioned above the cover hook 39. When the cover is initially placed on the container a clearance 43 exists between the container lip 7 and cover flange 21, and an equal clearance 45 between the container lip 11 and cover hook 39, the projecting portion 27 of the gasket ring 25 bearing against the frusto-conical container portion 5 so as to seal the joint between the cover and container and thus permit pressure to build up in the cooker. When the pressure builds up the cover rises to take up the clearances 43 and 45, the gasket due to its resiliency and the pressure in the cooker remaining in contact with the frusto-conical container portion 5 so that at all times the gasket renders the joint between the cover and the container steam-tight.

As shown, the base portion 33 of the handle and portion of the cover immediately below it are formed with a cylindrical perforation 47 in which is received the exteriorly cylindrical body portion 49 of a plug formed of resilient material such as synthetic rubber so that it may be sprung into the perforation and readily removed therefrom for replacement. Preferably, the body portion 49 of the plug is of smaller outside diameter than the perforation 47 to permit the plug to slide laterally relative to the cover. As shown, the plug is retained in the perforation by an upper outwardly projecting annular flange 51 formed as an integral part of the plug and resting on the upper side of the base portion 33 of the cover handle, and by an outwardly projecting annular flange 53 formed as an integral part of the plug and cooperating with the bottom surface of an annular recess 55 formed about the perforation at the under side of the cover. As shown, the flange 53 at its upper edge is provided with a relatively thin radially projecting annular portion 57. The upper surface of the flange 53, including the contiguous upper surface of the flange portion 57, is cupped, as indicated by the surface 59 (Fig. 6), to cause the upper side of the flange portion 57 adjacent its periphery to be in yielding continuous contact throughout its extent with the bottom of the recess 55. This insures that when the cover is initially placed on the container, and the cooker vent opening 61 in the plug is closed by the valve hereinafter described, pressure may build up in the cooker. When pressure builds up the flange 53, 57 of the plug is distorted so that the cupped surface 59 substantially throughout its extent and radial width will be firmly seated on the bottom of the recess 55.

As illustrated, the cover handle 29 adjacent the base portion 33 of the handle at each of opposite sides is provided with an upstanding ear 63, these ears carrying a pin 65 extending from one ear to the other. Pivoted for swinging movement on this pin is an elongated hub 67 which fits between the ears. This hub is formed as an integral part of the bottom plate 69 of a combined weight valve and pressure gauge having the casing 71, the bottom plate being secured to said casing by screws 73. Carried by the bottom plate at its underside is a projecting frusto-conical portion 75 which, when the parts are in the position shown by Fig. 6, projects into the bore of a metal bushing 77, which bore forms part of the vent opening 61 of the plug carried by the cover, the projection 75 under such conditions seating on the upper inner end edge of the bushing to close said opening and prevent escape of steam from the cooker.

As shown, the projection 75 of the weight valve is provided with a through opening 79 leading to a chamber 81 between the bottom plate 69 and a flexible diaphragm 83 soldered continuously about its periphery to the flange 85 of the weight valve casing 71. This diaphragm is connected by a member 87 to mechanism (not shown) for operating an indicator hand 89 cooperating with the graduated dial 91 positioned beneath a crystal 93 at the upper side of the weight valve casing, so that when the cover vent opening is closed the hand 89 will indicate the pressure in the cooker.

As further illustrated, the portion of the handle 29 between the ears 63 thereof is formed on its upper side with a cylindrical recess 95 (Fig. 6) which loosely receives a cylindrical lug 97 formed integrally with and projecting downwardly from the apex portion of a bent or angle lever 99, the convex portions of this lever at opposite sides of the lug 97 swingingly or rockably resting upon the upper surface of the handle member. At its outer end the lever 99 is formed with a head or weight 101 which intermediate its width carries a downwardly projecting pin or lock 103 received loosely within a perforation 105 formed in the handle 29. It will be observed that when the parts are in the position shown by Fig. 6, that is to say, when the cooker is not under pressure, and in the position of parts shown by Fig. 8 when the cooker is under pressure, the pin 103 is received in the notch 11 in the lip 9 of the container so as to prevent rotation of the cover relative to the container for disengaging the former from the latter.

As shown, the hub portion 67 of the bottom plate of the weight valve is formed with a projecting portion 107 the outer convex surface 109 of which presents a cam surface adapted to engage with the upper side of the upwardly bent tail portion 111 of the lever 99. When the weight valve is swung to its position shown by Fig. 9 this cam surface will engage the tail-piece of the lever to swing the lever in such direction as will pull the pin 103 out of the notch 11 of the container lip 9, so that the cover may then be rotated relative to the container for opening the cooker. It will be observed that, when the parts are in the position shown by Fig. 9, the upper edge portion 113 of the weight valve casing 71 will rest on the head 101 of the lever 99, under which condition, the center of gravity of the weight valve having been moved to the right of the pivot pin 65, the parts will remain in the position shown by Fig. 9 to maintain the cover vent opening 61 in open condition. In these connections it will be observed that after the weight valve is secured to the cover removal of the lever 99 is prevented by reason of the lug 97 and pin 103 being received in the recess 95 and opening 105, respectively, and by the weight valve preventing sufficient movement of the lever away from the cover body to withdraw said lug and pin from such recess and opening.

In operating the cooker, after the container is charged with food to be cooked the cover may be placed on the container and secured thereto in the manner hereinbefore described, the weight valve for such purpose being moved to its position shown by Fig. 9 to raise the pin 103 so that the cover and container handles may be brought into vertical alignment, under which conditions the hook 39 on the cover handle is under the container lip 9 and the pin 103 immediately over the notch 11 in the lip 9. Heating of the contents of the cooker will drive air out of the container through the cooker vent opening 61. As soon as steam is observed to escape from the vent opening the weight valve may be swung on its pivot to close the vent opening so as to cause pressure to build up within the cooker. Swinging of the weight valve to close the vent opening causes the lever 99 to fall by gravity, and the pin 103 to enter the notch 11, so that the cooker cannot be opened until the weight valve is again moved to its position shown by Fig. 9.

It will be further observed that the construction described insures that when the cooker is under pressure the operator will vent it by swinging the weight valve to its position shown by Fig. 9 before the cover can be removed from the cooker. When the parts are in their position shown by Fig. 8 the cam surface 109 is out of contact with the lever 99. This permits the weight valve partially to open the cooker vent opening when the pressure builds up to a predetermined maximum, so that such maximum pressure will not be exceeded, and the weight valve to again close the vent opening if the pressure falls below such maximum after the vent opening is thus partially opened.

It will be understood that within the scope of the appended claims wide deviations may be made from the form of the invention described without departing from the spirit of the invention.

I claim:

1. A pressure cooker comprising a container, a cover formed with a vent opening, radially projecting handles carried by said container and cover, respectively, a weight valve swingingly mounted on the upper side of said cover, which weight valve has a position of swinging in which it controls said vent opening and another position of swinging in which it maintains said vent opening open, said container and cover carrying cooperating portions operated into engaged position by rotating the cover relative to the container to bring said handles into vertical alignment for securing said cover to said container in steam-tight relation, a lever swingingly mounted intermediate its length on the upper side of the cover, one end portion of said lever carrying a downwardly projecting portion operatively adapted to cooperate with the container for preventing movement of said handles out of vertical alignment, the opposite end of said lever having a portion adapted to be engaged by said weight valve when the latter is swung into its said position in which it maintains said vent opening open for raising said downwardly projecting portion out of cooperation with said container for permitting said handles to be moved out of vertical alignment.

2. A pressure cooker comprising a container, a cover for said container; means for securing the cover to the container operated into engaged and released positions by rotation of the cover relative to the container; means for establishing and maintaining a predetermined pressure within the cooker comprising a vent opening formed in the cover, a movable valve cooperating with said opening adapted to be urged toward open position by presure within the cooker, a weight for controlling said valve swingingly carried by the cover for manual movement relative thereto from a first position in which the weight is operative to urge the valve toward closed position in opposition to the force exerted on the valve by pressure within the cooker whereby to establish and maintain such predetermined pressure to a second position in which the weight is inoperative to so urge the valve, means for locking the cover against rotation from its position in which it is secured to the container to its position in which it is released therefrom, comprising a part fixedly carried by the container presenting an abutment and a second part movably carried by the cover for movement into and out of locking relation with such abutment, and means operated by said weight for moving said second part into such locking relation when said weight is swung to its said first position and for moving said second part out of such locking relation when said weight is swung to its said second position.

3. A pressure cooker comprising a container, a cover for said container; means for securing the cover to the container operated into engaged and released positions by rotation of the cover relative to the container; means for establishing and maintaining a predetermined pressure within the cooker comprising a vent opening formed in the cover, a movable valve cooperating with said opening adapted to be urged toward open position by pressure within the cooker, a weight for controlling said valve swingingly carried by the cover for manual movement relative thereto from a first position in which the weight is operative to urge the valve toward closed position in opposition to the force exerted on the valve by pressure within the cooker to a second position in which the weight is inoperative to so urge the valve means for locking the cover against rotation from its position in which it is secured to the container to its position in which it is released therefrom, comprising a part fixedly carried by the container presenting an abutment, a member swingingly carried by the cover comprising a second part movable by swinging of said member into and out of locking relation with said abutment, and means operated by swinging of said weight for causing said member to swing to a position in which said second part is out of such locking relation when said weight is swung to its said second position and for causing said member to swing to a position in which said second part is in such locking relation when said weight is swung to its said first position.

GLENN C. WYMAN.

REFERENCES CITED

The following references are of record in the file of this patent:

UNITED STATES PATENTS

| Number | Name | Date |
|---|---|---|
| 191,059 | Kagy et al. | May 22, 1877 |
| 2,191,975 | Stephens | Feb. 27, 1940 |
| 2,297,378 | Wittenberg | Sept. 29, 1942 |
| 2,308,320 | Stephens | Jan. 12, 1943 |
| 2,436,566 | Goldberg | Feb. 24, 1948 |

FOREIGN PATENTS

| Number | Country | Date |
|---|---|---|
| 12,969 | Austria | Aug. 10, 1903 |